Figure 1:
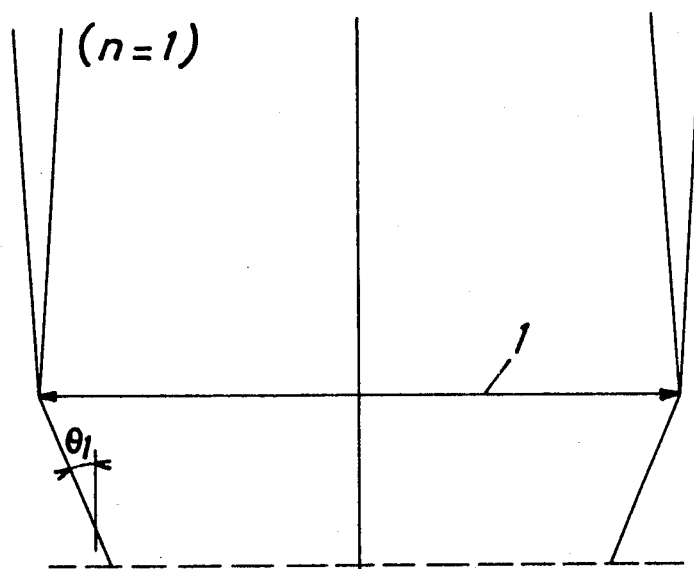
Figure 1:
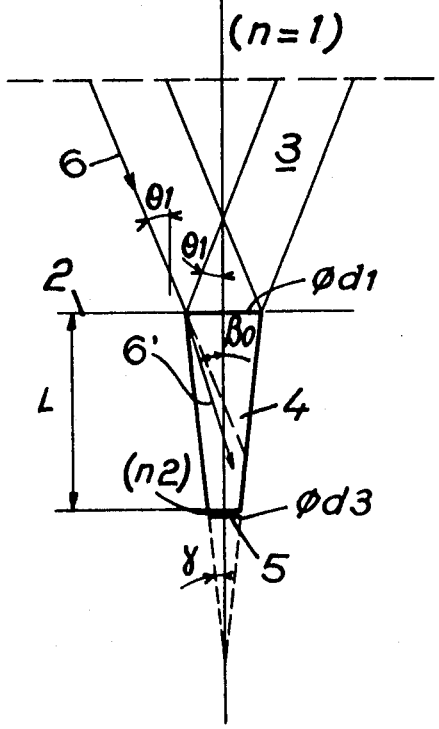

United States Patent

[11] 3,612,648

[72] Inventor Pierre Malifaud
 95 boulevard Jourdan, Paris, 14e, France
[21] Appl. No. 832,666
[22] Filed June 12, 1969
[45] Patented Oct. 12, 1971
[32] Priority June 12, 1968
[33] France
[31] 154,663

[54] OPTICAL CONCENTRATOR WITH MAXIMUM ILLUMINATION
2 Claims, 2 Drawing Figs.
[52] U.S. Cl. .................................. 350/96 R, 250/227
[51] Int. Cl. .................................. G02b 5/14
[50] Field of Search ........................... 350/96, 227

[56] References Cited
UNITED STATES PATENTS

| | | | |
|---|---|---|---|
| 3,187,627 | 6/1965 | Kapany | 350/96 B X |
| 3,413,468 | 11/1968 | Astheimer | 350/96 UX |
| 3,467,840 | 9/1969 | Weiner | 350/96 UX |

FOREIGN PATENTS

| | | | |
|---|---|---|---|
| 1,110,821 | 4/1968 | Great Britain | 350/96 |

Primary Examiner—John K. Corbin
Attorney—Schellin & Hoffmann

ABSTRACT: The radiation concentrator disclosed comprises a frustoconical mirror, or equivalent such as a bundle of tapered optical fibers, which concentrates flux from a frontal concentrator system onto a sensor. The dimensions of the mirror or equivalent are calculated by formulae which maximize the illumination of the sensor while accepting a preselected flux loss.

OPTICAL CONCENTRATOR WITH MAXIMUM ILLUMINATION

BACKGROUND OF THE INVENTION

The present invention relates to radiation concentrator for concentrating radiation on a sensitive element comprising a first concentrator system of relative aperture 1/N for providing a first concentration of the incident flux by forming an image at the smallest section of a beam whose rays subtend a half angle at the axis of the system of $\theta_1$ (sin $\theta_1 \approx 1/2N$), and at least one substantially frustoconical element for providing a second concentration of the flux by internal reflection from its substantially frustoconical surface wherein the entry section of said substantially frustoconical element will be coincident with the image produced by said first concentration optical system, and wherein the exit section of said substantially frustoconical element of smaller diameter, will be associated with said sensitive element.

In French Pat. No. 1,543,165, of May 6, 1964, a concentrator of the above mentioned kind is described, which enables maximum possible illumination power to be achieved whilst respecting the condition that the whole of the incident flux is exploited.

SUMMARY OF THE INVENTION

The present invention is a development of the invention the subject of that patent, and concerns the problem of achieving the maximum illuminating power for the smallest possible flux loss and particularly for a flux loss of a predetermined minimum proportion.

The present invention provides a radiation concentrator for concentrating electromagnetic radiation on a sensitive element, comprising a first concentration system of relative aperture 1/N for providing a first concentration of the incident flux by forming an image at the smallest section of a beam whose rays subtend a half angle $\theta_1$, at the axis of the system (where sin $\theta_1$ is substantially equal to 1/2N), and at least one substantially frustoconical element of apex half angle $\gamma$ for providing a second concentration of the flux by internal reflection in a medium of refractive index $n_1$ from its substantially frustoconical surface, wherein the entry section of said substantially frustoconical element, of diameter $d_1$, will be coincident with the image produced by said first concentration system, wherein the exit section of said substantially frustoconical element, of smaller diameter $d_3$, will be associated with said sensitive element through a medium of refractive index $n_2$, and wherein:

$$\frac{d_1}{d_3} = \frac{\sin(\lambda-\gamma)}{\sin(\beta_0-\gamma)} \quad (1)$$

$$\left(\frac{1-\tan\gamma\sqrt{\frac{n_1^2}{\sin^2\theta_1}-1}}{1-\tan\gamma\sqrt{\frac{n_1^2}{n_2^2}-1}}\right)^2 = \eta' \quad (2)$$

sin $\beta_0$=sin $\theta_1/n_1$; $\beta_0$ being the half angle of the rays entering said substantially frustoconical mirror after refraction at the entry section.

sin $\lambda = n_2/n_1$; $\lambda$ being the total reflection angle from the environment $n_1$ to the environment $n_2$.

$\eta'$ being a parameter equal to the ratio between the flux at the exit section and the flux incident at the the entry section of said substantially frustoconical element.

From equations (1) and (2) above, for a radiation source of a given apparent diameter, and for a first concentrator system of given diameter and relative aperture, and selecting a value for the parameter $d^1$ it is possible to determine unambiguously those dimensions of the substantially frustoconical element which will enable the maximum illuminating power to be achieved whilst losing only the predetermined proportion of flux.

Figure 2:
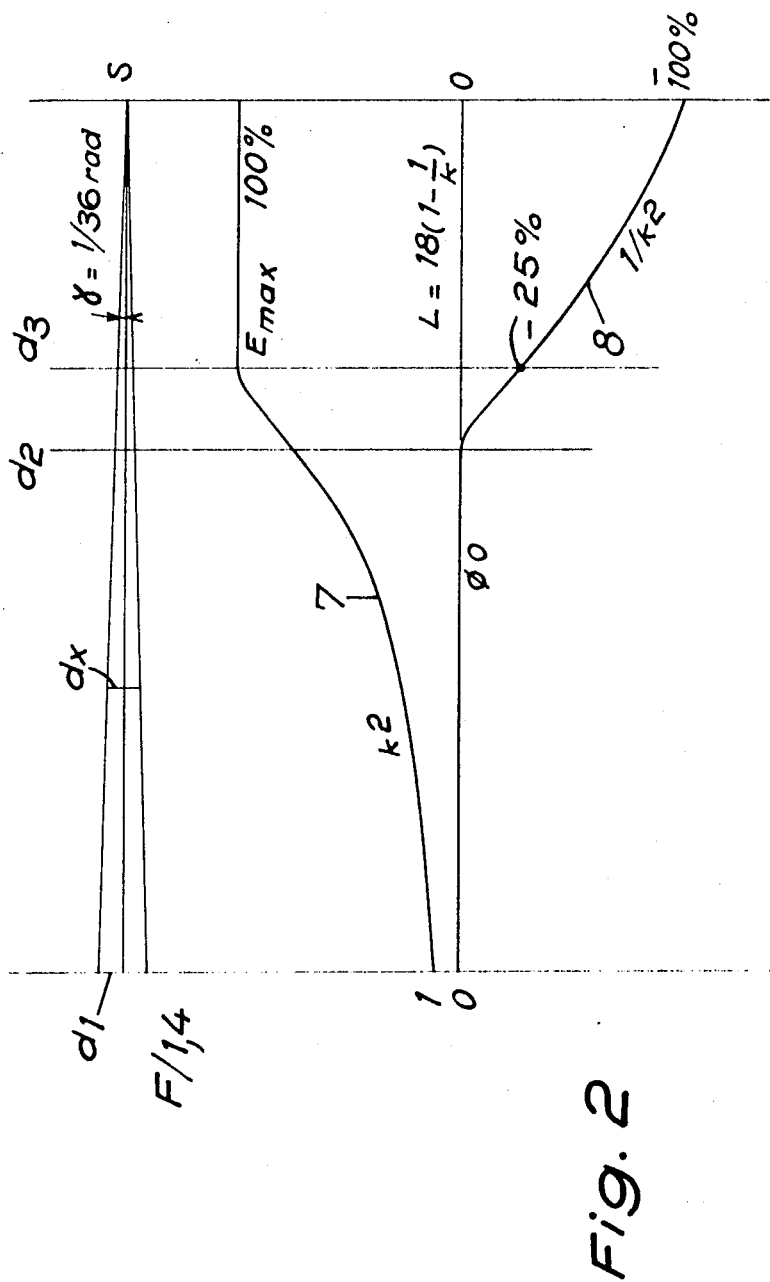

Other features and advantages of the present invention will be still better understood from a consideration of the following description of several embodiments thereof, given by way of example in conjunction with the accompanying drawings, in which:

FIG. 1 is an optical diagram of a concentrator in accordance with the invention; and FIG. 2 is a graph showing the variations in the illumination and the flux at the various sections of a frustoconical mirror.

FIG. 1, an optical concentrator device can be seen which combines, on the one hand, a frontal convergent optical system 1 of relative aperture 1/N, receiving a flux emanating from a distant radiation source which is not shown and is assumed to be located in a medium of refractive index equal to unity, said system producing a real image of the source in a plane 2 (focal plane) by means of a convergent beam whose rays 3 have an aperture half angle $\theta_1$, and, on the other hand, a frustoconical mirror or equivalent element 4 the entry section of which, of diameter $d_1$, is located in the image plane 2 in coincidence with the aforementioned image, said frustoconical mirror having an apex half angle $\gamma$, the refractive index of its internal medium being $n_1$ (in relation to the refractive index of the medium surrounding the radiation source), and having an exit section of calculated diameter $d_3$, which exit section is intimately associated with a sensing element 5 of a receiver device, the sensing element 5 being immersed in a medium of refractive index $n_2$.

In the same FIG. 1, the aperture half angle $\theta_1$ of the beam of radiation incident on the frustoconical mirror 4 has been illustrated by the line of a marginal meridian ray 6, and the aperture half angle $\beta_0$ of the ray 6' refracted at the entry section $d_1$ of said frustoconical mirror 4.

Choosing a ratio $\eta'$ (ratio between the flux picked up at the terminal section $d_3$ and the flux incident at the entry section $d_1$), and furthermore, given the characteristics of the frontal convergent optical system 1, then it is possible to determine the dimensions which will unambiguously characterize the frustoconical mirror 4 or equivalent element by means of the following formulas:

$$\frac{d_1}{d_3} = \frac{\sin(\lambda-\gamma)}{\sin(\beta_0-\gamma)} \quad (1)$$

$$\left(\frac{1-\tan\gamma\sqrt{\frac{n_1^2}{\sin^2\theta_1}-1}}{1-\tan\gamma\sqrt{\frac{n_1^2}{n_2^2}-1}}\right)^2 = \eta' \quad (2)$$

The following numerical example shows how the frustoconical mirror 4 is designed in a given instance:

Assume a source, located at a distance, of apparent diameter 5°, and a first convergent optical system constituted by for example a lens objective of relative aperture 1/1.414. This objective has a diameter of 55 mm. and a focal distance of 77.8 mm. It produces an image of diameter $i$ from the radiation source, which diameter $i$ is given by: $i$=77.8· tan 5°=6.8 mm.

The illumination of this image is in a ratio to the theoretical maximum illumination, which, as those skilled in the art will appreciate, is defined by 1/4 $N^2$, in other words 1/8 in this case.

Assume moreover that it is desired to achieve the maximum illumination with direct immersion of the sensing terminal element in a flint glass of index $n_2$=$n_1$=1.73, the frustoconical mirror 4 itself being made of this same flint glass. This immersion in flint glass is to permit of an extra concentration factor of $n^2_1$, that is to say three times. In other words, it is desired to obtain a (limiting) illumination 24 times more powerful than with the frontal optical system of relative aperture 1/1.4; and at the same time this is to be accompanied by a loss of no more than say 25 percent of the flux incident at the entry section $d_1$, in other words: $\eta'$=0.75.

In this example with the frontal optical system of relative aperture 1/1.4 is associated a refractive frustoconical mirror designed in accordance with the formulas listed hereinbefore.

The diameter $d_1$ of the large flux entry section is made equal to the diameter $i$ of the image produced by the frontal optical system and in the present instance in other words, $d_1 = 6.8$ mm.

By replacing $\eta'$ by 0.75 in formula (2); $n_1$ by 1.73; $n_2$ by 1.73 (immersion in $n_1$);

and:

$$\sin \theta_1 = 1/2N \text{ by} \frac{1}{2\sqrt{2}} = 0.354$$

we get:

$$1 - 4.8 \tan \gamma = \sqrt{0.75}$$

from which;

$$\tan \gamma = 0.028$$

and the apex half angle $\gamma = 1/36$ radians ($1°36'$)

Substituting this value of $\gamma$ in the formula (1), with $\sin \beta_o = \sin \theta_1/n_1 = 0.354/1.73$, in other words $\beta_o = 11° 48'$, we ultimately obtain:

$$6.8/d_3 = 0.9996/0.1771$$

from which: $d_3 = 1.2$ mm.

The length L of the frustoconical mirror is given by $(6.8 - 1.22 \tan \gamma$, viz:

$L = 100.8$ mm.

FIG. 2 illustrates a graph summarizing the results obtained by the concentrator, in the case of the numerical example hereinbefore quoted. On the abscissae, the length L of the frustoconical mirror between the entry section $d_1$ and an arbitrary section $d_x$, has been plotted, the mirror having an apex half angle of $\gamma = 1/36$ radians. Calling $k$ the ratio between the diameter $d_1$ and the diameter $d_x$ of an arbitrary section, we have:

$$L = \frac{1}{2 \tan \gamma} \left( 1 - \frac{1}{k} \right) = 18 \left( 1 - \frac{1}{k} \right)$$

The ordinates are chosen, on the one hand so that the curve 7 represents the variations in the ratio between the illumination at an arbitrary section and the illumination at the entry section $d_1$. On the other hand the curve 8 represents the variation in the ratio between the flux reaching an arbitrary section $d_x$ and the flux $\Phi_o$ incident at the entry section $d_1$.

From a consideration of these curves, it will be clearly seen how, in respect of a frustoconical mirror, the system can be optimized in two ways. The first of these ways, at a section $d_2$, makes it possible to achieve the strongest illumination (here 70 percent of the maximum illumination) without loss of flux. This optimization is obtained by dimensioning a frustoconical mirror in accordance with the disclosure of French Pat. No. 1,543,165 of May 6, 1964, and does not form part of the present invention.

The second way in which the system can be optimized, is offered by the present invention and is embodied by the section $d_3$ defined in accordance with the present invention, and makes it possible to achieve the maximum limiting illumination for the least possible flux loss (here 25 percent). This optimization is achieved through the dimensioning which forms the object of the present patent application.

It should be pointed out at this juncture that the formulas 1 and 2 hereinbefore listed are general formulas and several special cases will be examined hereinafter.

In addition, it has been found advantageous, where $n_1$ differs from unity and where $n_2$ differs from both $n_1$ and unity, to adjust the parameters $\gamma$ and $\beta_o$ in order to satisfy the relationship:

$$\lambda - \beta_o \simeq 2K\gamma \quad \ldots(3)$$

$K$ being a whole number.

Thus, the parameter $(\lambda - \beta_o/2\gamma)$, which defines, the maximum number of internal reflections for the meridian rays, is a whole number. This ensures that the totality of the rays combine to produce the maximum limiting illumination.

In special cases, the general formulas 1 and 2, may be simplified.

In the case where $n_2 = n_1$ and are different from unity (this being the case where the sensing element is immersed directly in a refractive frustoconical mirror), and taking account of the fact that in this case:

$$\sin \lambda = n_2/n_1 = 1;$$
$$\lambda = \pi/2 ;$$

and $\sin (\pi/2 - \gamma) = \cos \gamma$ the formulae become:—

$$\frac{d_1}{d_3} = \frac{\cos \gamma}{\sin (\beta_0 - \gamma)} \quad (4)$$

$$\left( 1 - \tan \gamma \sqrt{\frac{n_1^2}{\sin^2 \theta_1} - 1} \right)^2 = \eta' \quad (5)$$

Finally, in the case of a hollow frustoconical mirror, where both $n_1$ and $n_2$ are equal to unity and taking into account the fact that:

$$\sin \beta_o = \sin \theta_1/n_1 = \sin \theta_1 ;$$

and therefore $\beta_o = \theta_1$ : and $n_1/n_2 = 1$ ;
the formulas become:

$$\frac{d_1}{d_3} = \frac{\cos \gamma}{\sin (\theta_1 - \gamma)} \quad (6)$$

$$\left( 1 - \tan \gamma \sqrt{\frac{1}{\sin^2 \theta_1} - 1} \right)^2 = \eta' \quad (7)$$

It is possible to associate with a common frontal concentrator system several elementary frustoconical mirrors assembled in a bundle and operating in parallel, the bunch being made up for example of frustoconical optical fibers each having dimensions calculated in accordance with equations (1) and (2) above. Several advantages arise out of this kind of system. For example, it is possible in this way to reproduce upon the sensing element a mosaic image of the radiation source. The length of the bunch of elementary frustoconical mirrors thus produced is shorter in the proportion of the square root of the number of elementary mirrors, considered in a section passing through the axis, than the length of the equivalent single frustoconical mirror.

The present invention has applications in various fields, for example the detection of radiation of a wide range of wavelengths, in particular in the infrared spectrum; surveillance; optical telecommunications; monitoring of hot environments, and flame monitoring; photocontrol and thermocontrol; light condensers; photographic concentrators; solar energy concentrators; laser supplies.

I claim:

1. A radiation concentrator for concentrating electromagnetic radiation on a sensitive element, comprising a first concentration system of relative aperture 1/N for providing s first concentration of the incident flux by forming an image at the smallest section of a beam whose rays subtend a half angle $\theta_1$, at the axis of the system (where $\sin 1 \theta_1$ is substantially equal to 1/2 N), and at least one substantially frustoconical element of apex half angle $\gamma$ for providing a second concentration of the flux by internal reflection in a medium of refractive index $n_1$ from its substantially frustoconical surface, wherein the entry section of said substantially frustoconical element, of diameter $d_1$, will be coincident with the image produced by said first concentration system, wherein the exit section of said substantially frustoconical element, of smaller diameter $d_3$, will be associated with said sensitive element through a medium of refractive index $n_2$, and wherein:

$$\frac{d_1}{d_3} = \frac{\sin (\lambda - \gamma)}{\sin (\beta_0 - \gamma)} \quad (1)$$

$$\left\{ \frac{1 - \tan \gamma \sqrt{\frac{n_1^2}{\sin^2 \theta_1} - 1}}{1 - \tan \gamma \sqrt{\frac{n_1^2}{n_2^2} - 1}} \right\} = \eta' \quad (2)$$

$\sin \beta_o = \sin \theta_1/n_1$; $\beta_o$ being the half angle of the rays entering said substantially frustoconical mirror after refraction at the entry section.

$\sin \lambda = n_2/n_1$; $\lambda$ being the total reflection angle from the environment $n_1$ to the environment $n_2$. $\eta'$ being a parameter equal to the ratio between the flux at the exit section and the flux incident at the entry section of the said substantially frustoconical element.

2. A concentrator as claimed in claim 1, wherein: $\lambda - \beta_o \simeq 2K\gamma$ .......(3)

$K$ being a whole number.